No. 870,822. PATENTED NOV. 12, 1907.
A. HALVORSON.
HAY BLOWER.
APPLICATION FILED MAR. 14, 1907.

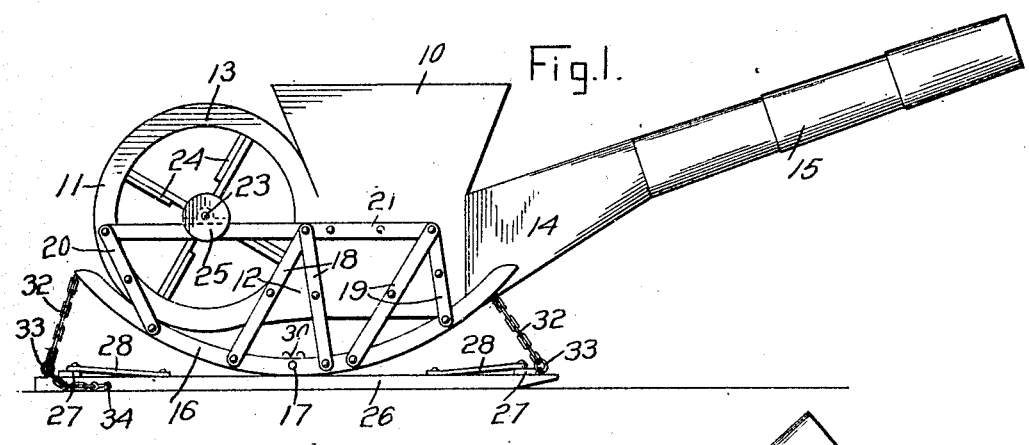
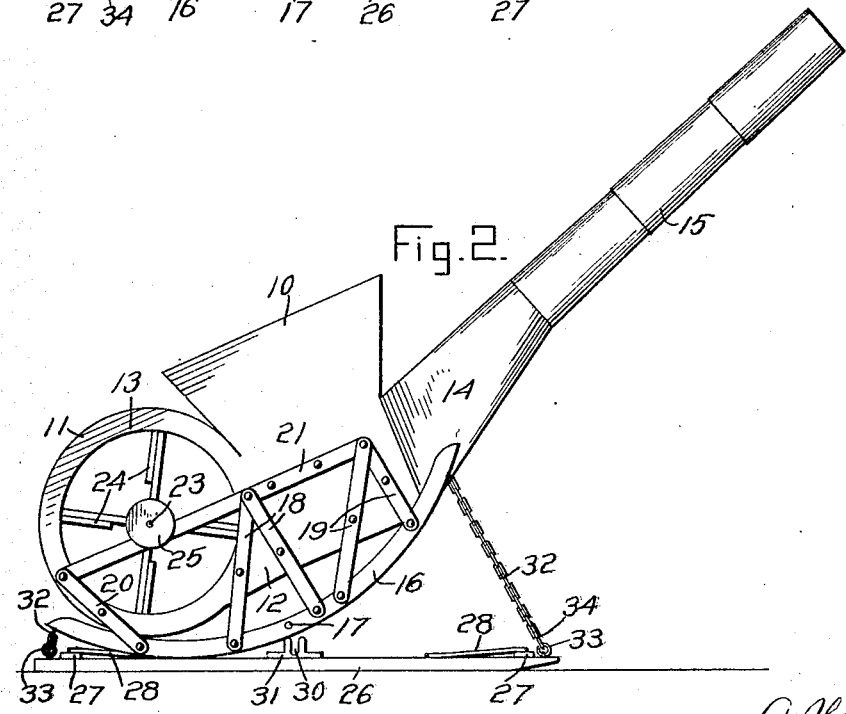

3 SHEETS—SHEET 2.

Witnesses
C. K. Reichenbach
G. G. Smith

Inventor
A. Halvorson
By Chandler & Chandler
Attorneys

No. 870,822. PATENTED NOV. 12, 1907.
A. HALVORSON.
HAY BLOWER.
APPLICATION FILED MAR. 14, 1907.
3 SHEETS—SHEET 3.
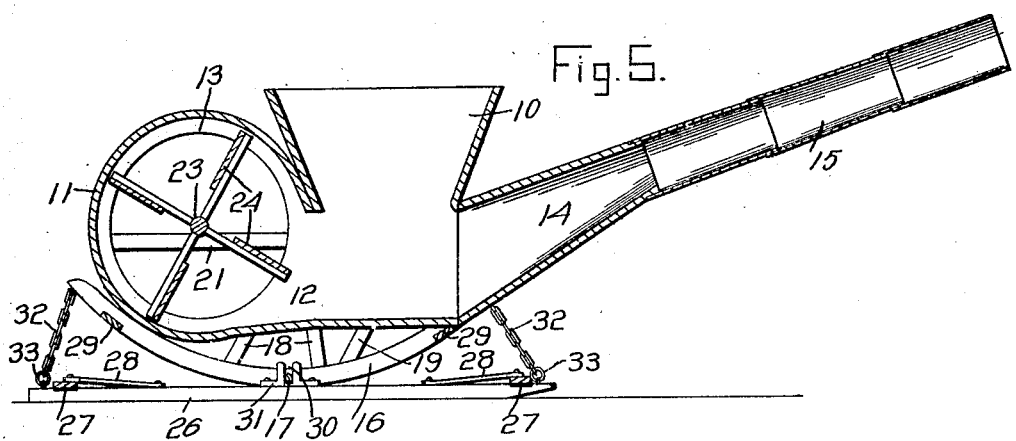
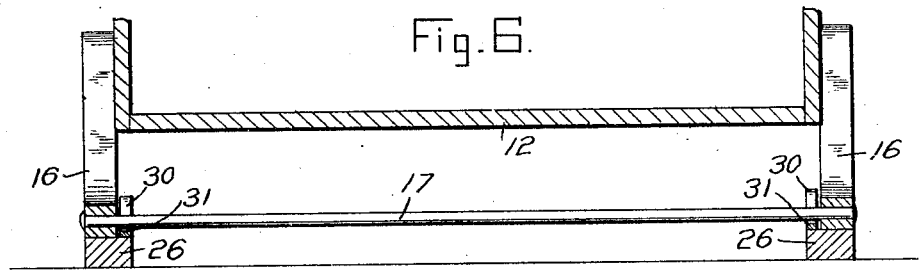
Witnesses
C. K. Reichenbach.
L. G. Smith.
Inventor
A. Halvorson.
By Chandler & Chandler
Attorneys

UNITED STATES PATENT OFFICE.

ALBERT HALVORSON, OF RICE LAKE, WISCONSIN.

HAY-BLOWER.

No. 870,822.   Specification of Letters Patent.   Patented Nov. 12, 1907.

Application filed March 14, 1907. Serial No. 362,371.

*To all whom it may concern:*

Be it known that I, ALBERT HALVORSON, a citizen of the United States, residing at Rice Lake, in the county of Barron, State of Wisconsin, have invented certain new and useful Improvements in Hay-Blowers; and I do hereby declare the following to be a full, clear, and exact description of the invention, such as will enable others skilled in the art to which it appertains to make and use the same.

This invention relates to pneumatic stackers and more particularly to that class which are designed for use in loading hay into a barn or like structure and the primary object of the invention is to do away with old methods of loading hay and provide a device which will only necessitate the employment of one man.

The device consists of a blower, a hopper into which the blower is designed to direct a blast and a stacker tube through which the hay from the hopper is blown and the true invention lies in the means for tilting or adjusting the stacker tube so that the hay may be introduced through an upper or lower window to the barn as may be desired.

Figure 3:
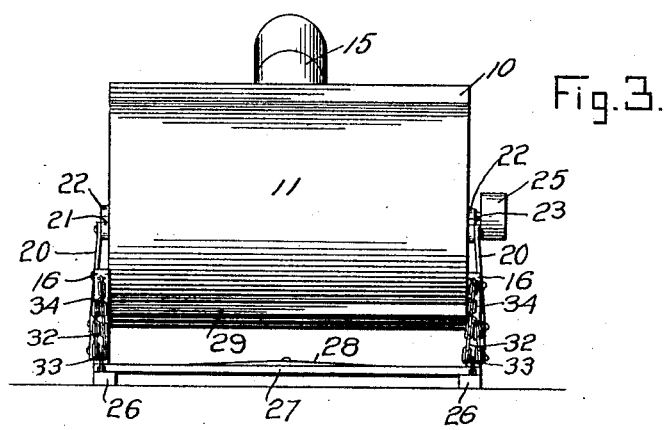
Figure 4:
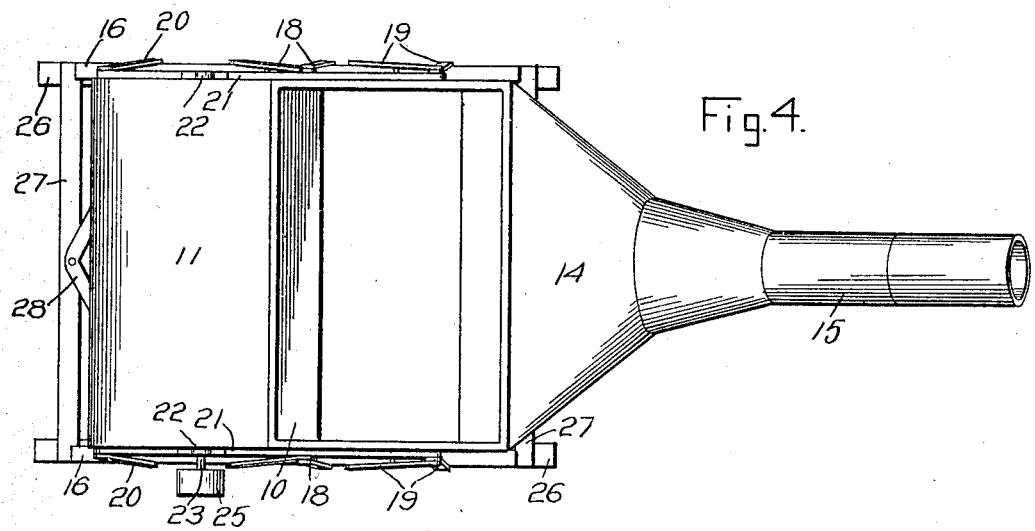

In the accompanying drawings, Figure 1 is a side elevation of my invention showing the parts in their normal position, Fig. 2 is a similar view showing the stacker tube elevated, Fig. 3 is a rear end elevation, Fig. 4 is a top plan view, Fig. 5 is a detail vertical longitudinal sectional view, and, Fig. 6 is a vertical transverse sectional view.

Referring more specifically to the drawings my invention is shown as comprising a hopper 10 which is of the ordinary construction with the exception that it has a closed bottom. Disposed rearwardly of this hopper is a fan casing 11 which has a spout portion 12 which communicates with the hopper through the rear side thereof. This fan casing is open at both ends and has each of its ends flanged annularly as at 13. The throat 14 of a stacker tube 15 leads from and communicates with the front side of the hopper 10 and is secured to the hopper.

To support the fan casing, the hopper, and the stacker tube, I have provided a rocking frame which frame comprises a pair of rockers 16 which are connected at their middles by means of a rod 17 which is secured at its ends to the rockers at the point mentioned. Secured at their lower ends to each of the rockers and extending upwardly in converging planes are pairs of standards 18 and 19 and a standard 20 also extends upwardly from the rocker at its rear end. The standards 18 and 19 of each pair are connected at their upper ends and a cross piece 21 is bolted to the meeting upper ends of the said uprights and at its rear end to the upper end of the upright 20. The uprights 19 are bolted to the hopper 10 at corresponding ends thereof as is also the cross piece 21. The standards 18 are bolted to the adjacent flanges at the ends of the fan casing 11 and so is the standard 20 and the rear end and middle of the cross piece 21. Journaled in suitable bearings 22 upon the cross pieces 21 is the fan shaft 23 from which radiates blades 24 and upon which is fixed a pulley 25 for the connection of the drive belt of a suitable motor (not shown).

I have provided, for the support of the frame above described, a sled or drag which includes runners 26 and cross pieces 27 which connect the runners at their forward and rearward ends and are braced by means of suitable brace rods 28. The rockers which are also connected by means of cross braces 29 at their front and rear ends, rest upon the runners of the drag and normally the rod 17 which connects the runners is seated in notches 30 formed in brackets 31 carried by the runners. Now in order that the fan casing, the hopper, and the stacker tube may be held in various tilted positions after being so rocked, I have provided a plurality of chains 32 one of which is connected to each rocker at each end and is engaged through a ring 33 loosely carried by the corresponding runner and at the corresponding end thereof. Each of these chains is provided with a hook 34 at its free end which hook is adapted for engagement interchangeably with the links of the chain between the rocker and the ring upon the runner or with the opposite chain.

It will of course be understood that when the frame of the device is rocked, the rods 17 will unseat from the notches or bifurcations 30 in the brackets 31 but that when the device is being transported it is rocked so that the rod will reseat in the bifurcations and prevent displacement of the frame from the drag. It will furthermore be understood that a variety of adjustments may be had and that in every case the hopper will be readily accessible so that hay may be thrown into it.

What I claim is—

1. The combination with a blower of the class described, of a rocking frame for supporting the blower, a drag for supporting the frame, said frame being adapted to be rocked upon the drag, and chains connecting the frame and drag for holding the frame in its rocked position.

2. The combination with a blower of the class described, of a drag including side sills, a rocking frame supporting the blower and having its rockers supported upon the side sills of the drag and adapted to rock thereon, notched brackets secured upon the said side sills, a rod connecting the rockers of the rocking frame and adapted to seat at times in the notches in the brackets, and chains connected with the ends of the rockers of the rocking frame and with the ends of the side sills of the drag whereby the rocking frame may be held at various adjustments.

In testimony whereof, I affix my signature, in presence of two witnesses.

ALBERT HALVORSON.

Witnesses:
ARCHIE C. GRILLEY,
NORA FRANCIS.